United States Patent
Bernhardt (10) Patent No.: US 11,613,219 B2
(45) Date of Patent: Mar. 28, 2023

(54) ENERGY SUBSYSTEMS INTEGRATED INTO STRUCTURAL COMPONENTS OF AN AIRCRAFT

(71) Applicant: THE BOEING COMPANY, Chicago, IL (US)

(72) Inventor: Roger D. Bernhardt, St. Louis, MO (US)

(73) Assignee: THE BOEING COMPANY, Arlington, VA (US)

(*) Notice: Subject to any disclaimer, the term of this patent is extended or adjusted under 35 U.S.C. 154(b) by 858 days.

(21) Appl. No.: 16/437,800

(22) Filed: Jun. 11, 2019

(65) Prior Publication Data
US 2020/0391683 A1 Dec. 17, 2020

(51) Int. Cl.
*B64C 3/18* (2006.01)
*H02G 5/06* (2006.01)
(Continued)

(52) U.S. Cl.
CPC .............. *B60R 16/04* (2013.01); *B64C 3/185* (2013.01); *B64C 3/32* (2013.01); *B64D 27/26* (2013.01); *H01M 50/20* (2021.01); *H02B 1/20* (2013.01); *H02G 5/061* (2013.01); *B64C 2201/042* (2013.01); *B64D 2221/00* (2013.01)

(58) Field of Classification Search
CPC ......... B64C 3/32; B64C 3/18; B64D 2221/00; B64D 41/00; B64D 27/24; B64D 2211/00; H01M 50/20; H01M 2220/20
See application file for complete search history.

(56) References Cited

U.S. PATENT DOCUMENTS 3,937,424 A * 2/1976 Meier .................. H01M 50/00
429/99
5,810,284 A * 9/1998 Hibbs .................... B64D 27/24
244/45 R
(Continued)

FOREIGN PATENT DOCUMENTS

EP      1070661 A2   1/2001
EP      3187422 A1   7/2017
(Continued)

OTHER PUBLICATIONS

European Patent Office, Communication Pursuant to Article 94(3) EPC for Appliation 20 171 762.6 1010 dated Jan. 27, 2022.
(Continued)

*Primary Examiner* — Philip J Bonzell
*Assistant Examiner* — Colin Zohoori
(74) *Attorney, Agent, or Firm* — Patterson + Sheridan, LLP (57) ABSTRACT

The present disclosure provides a structural member for a vehicle. The structural member comprises a plurality of finned spar members interlocked with one another, wherein each finned spar member of the plurality of finned spar members includes a main body, a plurality of web members extending from a flange of the main body, a circuit board formed on the main body, and a bus bar comprising a tube positioned in an opening formed in the main body, the bus bar being in electrical communication with the circuit board, wherein a compartment is formed between adjacent web members, the compartment being sized to receive a battery.

19 Claims, 5 Drawing Sheets

(51) Int. Cl.
    *H02B 1/20*     (2006.01)
    *B64C 3/32*     (2006.01)
    *B64D 27/26*     (2006.01)
    *H01M 50/20*     (2021.01)
    *B60R 16/04*     (2006.01)

(56) References Cited

U.S. PATENT DOCUMENTS

| | | | |
|---|---|---|---|
| 8,967,529 B1* | 3/2015 | Bennett | B64D 27/24 |
| | | | 446/57 |
| 2011/0223458 A1* | 9/2011 | Ferber, Jr. | H01M 50/502 |
| | | | 429/99 |
| 2018/0099756 A1* | 4/2018 | Gore | H01M 6/42 |
| 2019/0296300 A1* | 9/2019 | Zimmermann | H01M 10/6556 |

FOREIGN PATENT DOCUMENTS

| | | |
|---|---|---|
| EP | 3326917 A1 | 5/2018 |
| EP | 3544083 A1 | 9/2019 |
| JP | H0858617 A | 3/1996 |
| WO | 0175989 A2 | 10/2001 |

OTHER PUBLICATIONS

European Patent Office Extended European Search Report for Application No. 20171762.6-1010 dated Oct. 23, 2020.

* cited by examiner

ENERGY SUBSYSTEMS INTEGRATED INTO STRUCTURAL COMPONENTS OF AN AIRCRAFT

GOVERNMENT RIGHTS IN THIS INVENTION

This invention was made with government support under contract number FA8650-18-C-2807 awarded by the Department of Defense. The government has certain rights in this invention.

BACKGROUND

Aspects of the present disclosure provide methods and apparatuses for onboard battery storage as well as onboard energy subsystems integrated into structural components of a vehicle, such as an aircraft.

Batteries and other elements of energy systems for aircraft or other vehicles are conventionally packaged as part of a payload of the aircraft or other vehicle. This conventional packaging typically includes batteries at least partially enclosed in an explosion-proof and/or fire-proof structure. Thus, the weight of the batteries as well as the structures containing the batteries add payload weight to the aircraft or other vehicle, which results in the need for more operational power in order to compensate for the additional power consumed due to the weight of energy system.

SUMMARY

The present disclosure provides methods and apparatus for onboard battery storage as well as onboard energy subsystems integrated into structural components of a vehicle, such as an aircraft.

In one implementation, a structural member for a vehicle is provided. The structural member comprises a plurality of finned spar members interlocked with one another, wherein each of the finned spar members includes a main body, a plurality of web members extending from a flange, a circuit board formed on the main body, and a bus bar comprising a tube positioned in an opening formed in the main body, the bus bar being in electrical communication with the circuit board, wherein a compartment is formed between adjacent web members, each compartment being sized to receive a battery.

In another implementation, an aircraft spar is provided. The aircraft spar includes a plurality of finned spar members interlocked with one another. Each of the finned spar members includes a main body, a plurality of web members extending from a flange, a circuit board formed on the main body, and a bus bar comprising a tube positioned in an opening formed in the main body, the bus bar being in electrical communication with the circuit board, wherein a compartment is formed between adjacent web members, each compartment being sized to receive a plurality of batteries.

In another implementation, an onboard energy subsystem for a vehicle is provided. The onboard energy subsystem comprises a structural member comprising a plurality of batteries. The structural member comprises a plurality of finned spar members interlocked with one another. Each of the finned spar members includes a main body, a plurality of web members extending from a flange, a circuit board formed on the main body, and a bus bar comprising a conductive tube positioned in an opening formed in the main body, the bus bar being in electrical communication with the circuit board, wherein a battery of the plurality of batteries is compressed in a compartment is formed between adjacent web members.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

The present disclosure provides methods and apparatuses for onboard battery storage as well as onboard energy subsystems integrated into structural components of a vehicle or craft, such an aircraft. The onboard energy system as described herein may be utilized, for example, in a spar or other structural member of an aircraft. The spar or other structural member as described herein may be utilized on any size of aircraft, such as a small remotely operated vehicle, a drone, or other similar aircraft, up to and including larger aircraft, such as narrow and wide body passenger aircraft. The onboard energy subsystems as described herein may be utilized to power engines, motors, electronic systems, emergency systems, sensor systems, aerodynamic surface control systems, or any other electrical system of the aircraft during use.

Figure 1:
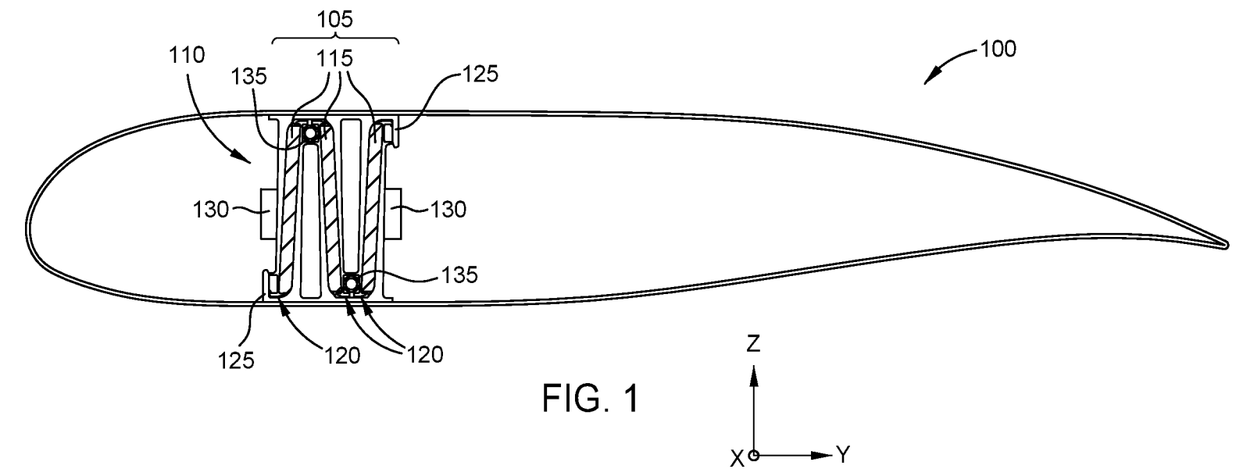
FIG. 1 is a schematic sectional view of a wing having one embodiment of a spar that structurally supports the wing.

FIG. 1 is a schematic sectional view of a wing 100 having one embodiment of a structural member, shown as a spar 105, which structurally supports the wing 100. The spar 105 runs along a portion of a length of the wing 100 (in the X direction) and couples to a support member of the aircraft (not shown), such as a frame of a fuselage of the aircraft. The wing 100 depicted in FIG. 1 may also be an empennage or vertical stabilizer having the spar 105 as a main or primary structural member.

The spar 105 in this embodiment comprises an onboard energy subsystem 110. The onboard energy subsystem 110 comprises a plurality of batteries 115 mounted in compartments 120 provided between a plurality of finned spar members 125. The compartments 120 and the finned spar members 125 are more clearly shown in FIGS. 2A and 2B.

Each of the plurality of finned spar members 125 are integrated together to form a main or primary structural member (e.g., the spar 105) for the wing 100. The plurality of finned spar members 125 are detachable to facilitate installation or removal of individual batteries 115 from the compartments 120. Each of the finned spar members 125 may be made of a polymer material, such as a thermoplastic material formed by a 3D printing or an extrusion process. In other embodiments, the finned spar members 125 may be made of a lightweight metallic material such as aluminum, or a composite material such as a polymer/carbon fiber composite.

In an example, each of the batteries 115 is a lithium-ion battery. In one example, the batteries 115 utilized in the onboard energy subsystem 110 are "pouch cells" and may be connected in series. In one particular example, the batteries 115 comprise six cells in a serial connection to produce 24 volts, and each six-cell pack is connected in parallel along the length of the spar 105 (in the X direction).

The batteries 115 may be small enough such that damage to an individual cell does not ignite or damage the spar 105 or the wing 100 and does not affect the operation of other batteries 115. For example, if one battery pouch is punctured or otherwise damaged, the accumulation of explosive gases within the pouch is not enough to cause an explosion or fire. In one example, each of the batteries 115 may be about 2 inches by about 2 inches. Each compartment 120 is sized slightly larger than the surface area of the battery 115 or the plurality of batteries 115, and the compartment includes a width that slightly compresses sides of the battery 115 or the plurality batteries 115 as described in more detail below.

The spar 105 may also include one or more power management devices 130. The power management devices 130 may be configured to control charging, short circuit protection, health monitoring, as well as other power management and/or battery maintenance utilities. Circuitry for the batteries 115 is provided in or on a portion of the finned spar members 125. For example, a bus bar 135 is provided in each of the finned spar members 125. The bus bars 135 are operably coupled to each of the batteries 115, or operably coupled to groups of the batteries 115. Other portions of the circuitry of the onboard energy subsystem 110 are shown in the following Figures.

The plurality of finned spar members 125 are adapted to engage and provide slight pressure or compression against each of the batteries 115. The compression applied to the batteries 115 by the finned spar members 125 prevents degradation of the batteries 115. The compression of the batteries 115 against the finned spar members 125 also integrates the batteries 115 into structural members of the spar 105. For example, each of the compressed batteries is utilized for any structural strength therein due to the compression against the finned spar members 125. The compression effectively packs or loads the spar 105 such that structural strength thereof is enhanced as opposed to an uncompressed or a "loose" connection between the finned spar members 125 and the batteries 115.

In some embodiments, each bus bar 135 is a tube made of a lightweight electrically conductive material that is has a length that spans the length of the spar 105 (in the X direction). The bus bars 135 are utilized to increase the structural integrity of the spar 105 while also serving as a conductive pathway. Examples of the material for the bus bar 135 include aluminum or titanium, or other materials having a high specific strength, such as carbon fiber materials. In other examples, the bus bars 135 may be made of a polymeric material, a metallic material, or a fibrous material that is coated with an electrically conductive material, such as gold (Au) or other electrically conductive material or coating.

Figure 2A:
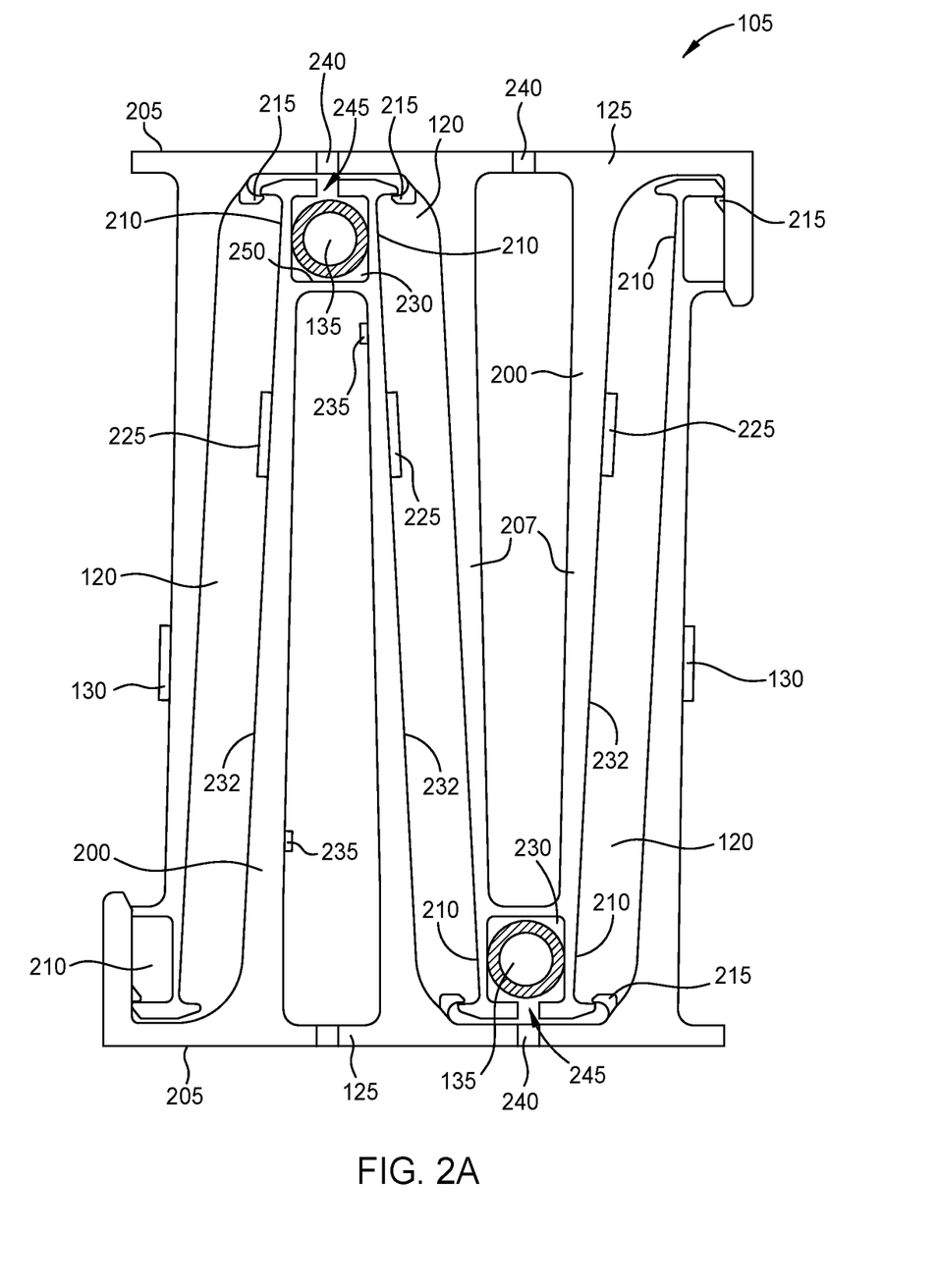
FIG. 2A is a sectional view of a spar without the batteries.
Figure 2B:
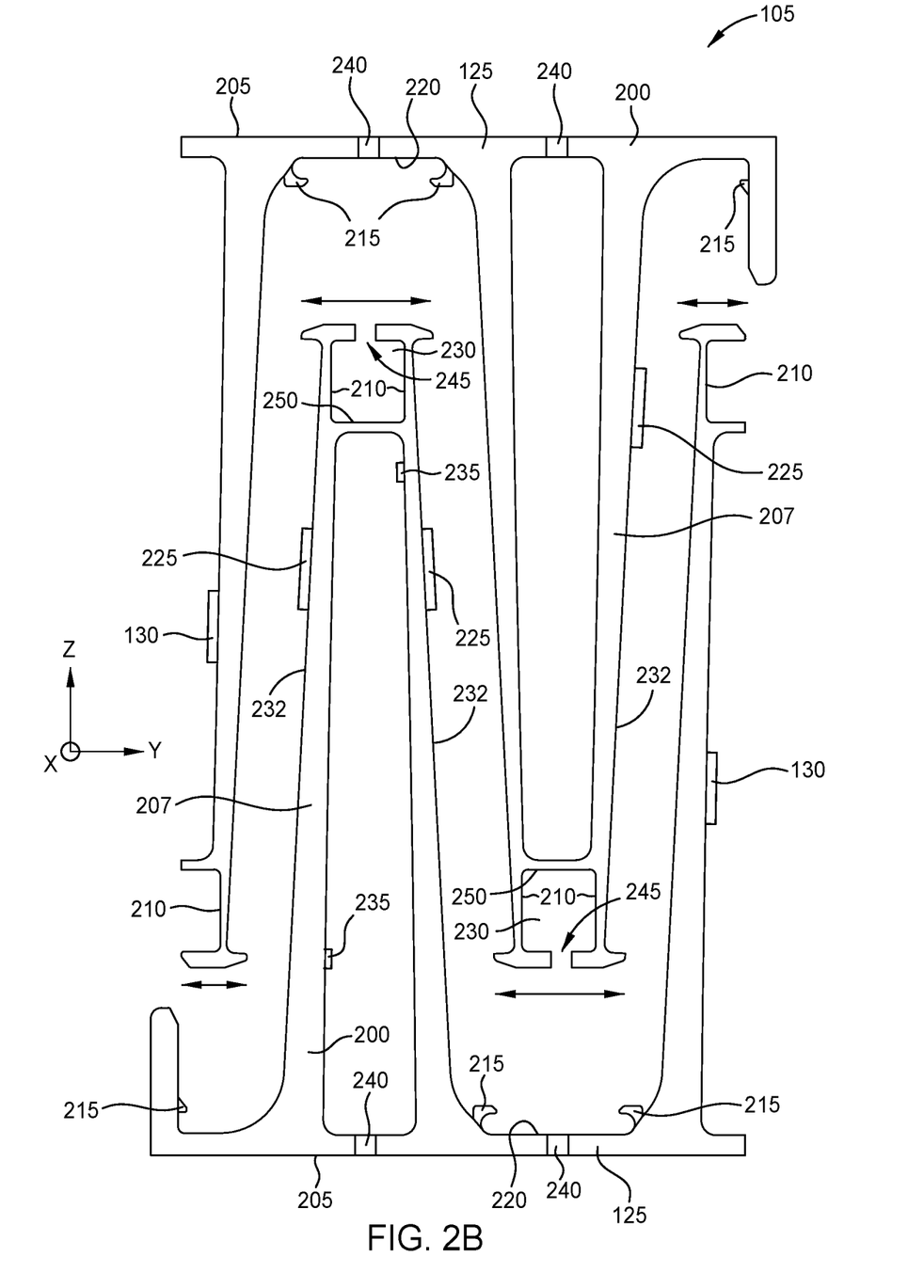
FIG. 2B is a sectional exploded view of the spar of FIG. 2A.

FIG. 2A is a sectional view of the spar 105 without the batteries 115 and FIG. 2B is a sectional exploded view of the spar 105 of FIG. 2A. The spar 105 includes the plurality of finned spar members 125 as shown in FIG. 1. In the embodiment shown, the spar 105 includes two finned spar members 125 that snap together to form the spar 105 as shown in FIG. 2A. In FIG. 2B, the two finned spar members 125 are separated in a manner where the batteries 115 can be installed or removed.

In the embodiment of FIGS. 2A and 2B, the finned spar members 125 are substantially identical and can be interchanged with each other. Each of the finned spar members 125 includes a main body 200 and a flange 205. A portion of the main body 200 includes a plurality of web members 207 that extend from the flange 205. The main body 200 can be considered as a web that couples to the flange 205. When the finned spar members 125 are coupled together as shown in FIG. 2A, the main bodies 200 and the flanges 205 form an "I" beam like support member.

Each of the finned spar members 125 includes a plurality of flexible members 210 that flex and rebound in the direction of the arrows in FIG. 2B. The flexible members 210 compress and couple to retaining members 215 formed on an inner surface 220 (shown in FIG. 2B) of the flanges 205. To interlock the finned spar members 125, one finned spar member 125 is rotated 180 degrees along the length direction thereof (the X axis as shown in FIG. 2B) and fastened together. In other embodiments, a finned spar may include fewer or more flexible members as compared to the example depicted in FIGS. 2A and 2B.

Circuitry for the onboard energy subsystem 110 shown in FIG. 1 is illustrated schematically in FIGS. 2A and 2B. For example, conductors 225 are coupled to or formed on a web surface 232 of the main bodies 200 of each of the finned spar members 125. The conductors 225 are electrically connected to a respective bus bar 135 (only shown in FIG. 2A) of each of the finned spar members 125. One of the bus bars 135 is a negative (−) bus bar and the other bus bar 135 is a positive (+) bus bar. The bus bars 135 may carry power as well as data.

Each bus bar 135 is provided in an opening 230 formed in the main body 200 of each of the finned spar members 125. In the embodiments where the finned spar members 125 are made of metallic materials or include an electrically conductive material (such as carbon fibers), a dielectric layer (not shown) may be provided between the main bodies 200 of each of the finned spar members 125 and the conductors 225 to electrically insulate the conductors 225 from the finned spar members 125. Additionally, the openings 230 may include a dielectric material to electrically insulate the bus bars 135 from the finned spar members 125. In some embodiments, the conductors 225 are circuit boards that are printed or etched onto the web surface 232 of the finned spar members 125.

Additionally, in some embodiments, the finned spar members 125 include electrical generating devices 235 embedded therein or thereon. The electrical generating devices 235 may be connected to the onboard energy subsystem 110 via the power management devices 130. Each of the electrical generating devices 235 are utilized to generate electricity from structural bending of the spar 105, such as when the spar 105 of the wing 100 bends during flight. Each of the electrical generating devices 235 may be piezoelectric devices in some embodiments.

Each of the finned spar members 125 includes openings 240 formed in the flanges 205. The openings 240 may be utilized to reduce the weight of the spar 105. The openings 240 may also be used to attach elements of the wing 100 to the spar 105, such as the wing skin. Slots 245 are also formed in the main bodies 200 of each of the finned spar members 125. The slots 245 are utilized to provide lateral movement of the flexible members 210 when connecting or disconnecting the finned spar members 125. Spacers 250 may be provided between the flexible members 210.

Figure 3A:
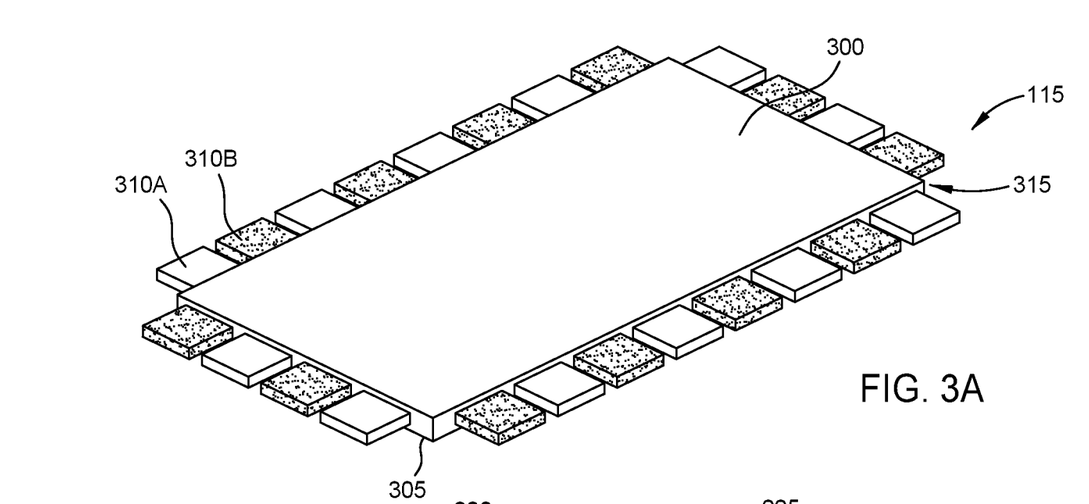
FIG. 3A is an isometric view of one embodiment of a battery.

FIG. 3A is an isometric view of one embodiment of a battery 115. The battery 115 includes a top cover 300 and a bottom cover 305 defining a pouch 315 that encapsulates a plurality of electrode layers or foils (not shown). The battery 115 also includes a plurality of electrode collector tabs coupled to the specific electrode layers of the battery 115.

The electrode collector tabs include a first set of electrode collector tabs 310A and a second set of electrode collector tabs 310B. The electrode collector tabs 310A have a positive (+) polarity while the electrode collector tabs 310B have a negative (−) polarity. The electrode collector tabs 310A alternate with the electrode collector tabs 310B. Each of the electrode collector tabs 310A and the electrode collector tabs 310B may comprise or be coated with an electrically conductive metal, such as copper (Cu) or gold (Au). In other embodiments, the arrangement of the electrode collector tabs of different polarity may be in other patterns, rather than alternating as in this embodiment. For example, two sides of pouch 315 may have negative polarity collector tabs while the other two sides of pouch 314 may have the positive polarity collector tabs. In further embodiments, there may be more or fewer collector tabs as compared to the embodiment depicted in FIG. 3A. Many arrangements are possible.

Figure 3B:
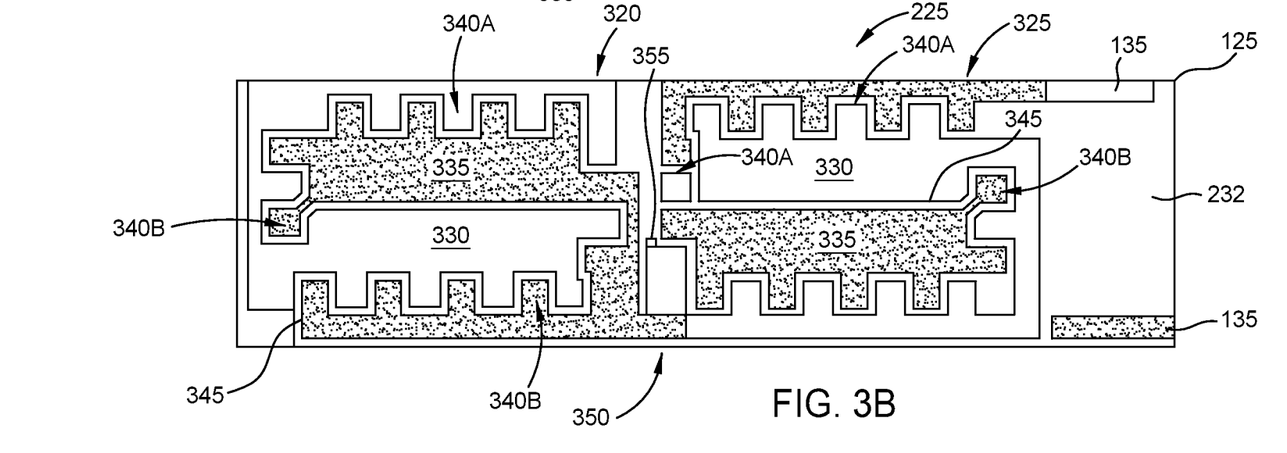
FIG. 3B is a schematic side view of one embodiment of electrical conductors.

FIG. 3B is a schematic side view of one embodiment of the conductors 225. The conductors 225 include a plurality of circuit patterns, shown as a first circuit pattern 320 and a second circuit pattern 325. Each of the first circuit pattern 320 and the second circuit pattern 325 may be formed in or on the web surface 232 of the finned spar member 125 (a portion of which is shown in FIG. 3B). The first circuit pattern 320 and the second circuit pattern 325 may be etched onto, printed onto, or otherwise formed on the web surface 232 and then portions thereof are coated with an electrically conductive material.

Each of the first circuit pattern 320 and the second circuit pattern 325 include a first trace pattern 330 and a second trace pattern 335. The first trace patterns 330 have a plurality of contact pads 340A and the second trace patterns 335 have a plurality of contact pads 340B alternating with the contact pads 340A. The contact pads 340A are configured to align with the electrode collector tabs 310A of battery 115 (shown in FIG. 3A) and the contact pads 340B are configured to align with the electrode collector tabs 310B (shown in FIG. 3A). Thus, the first trace patterns 330 are positive polarity patterns and the second trace patterns 335 are negative polarity patterns. Each of the first trace patterns 330 and the second trace patterns 335 may comprise or be coated with an electrically conductive metal, such as copper (Cu) or gold (Au). Each of the first trace patterns 330 and the second trace patterns 335 are electrically separated by a dielectric break 345. The dielectric break 345 may be the base (uncoated) material of the finned spar member 125.

When the batteries 115, such as the battery 115 shown in FIG. 3A, is installed onto the finned spar member 125, the electrode collector tabs 310A are aligned with the contact pads 340A, and the electrode collector tabs 310B are aligned with the contact pads 340B. Contact between the respective electrode collector tabs and contact pads are established via pressure or compression against each of the batteries 115 when the finned spar members 125 are coupled together as described above. In some embodiments, the batteries may include connectors at each collector tab that interface with connectors at each contact pad, while in other embodiments the collector tabs and contact pads may be soldered together.

In the depicted embodiment, each of the first trace patterns 330 and the second trace patterns 335 connect at a connection interface 350 to form a serial connection between the first circuit pattern 320 and the second circuit pattern 325. Each of the first trace patterns 330 are connected to one bus bar 135 and the second trace patterns 335 are connected to the other bus bar 135. In some embodiments, the connection interface 350 includes a fusible link 355 which may provide overload protection between the first circuit pattern 320 and the second circuit pattern 325.

Figure 4:
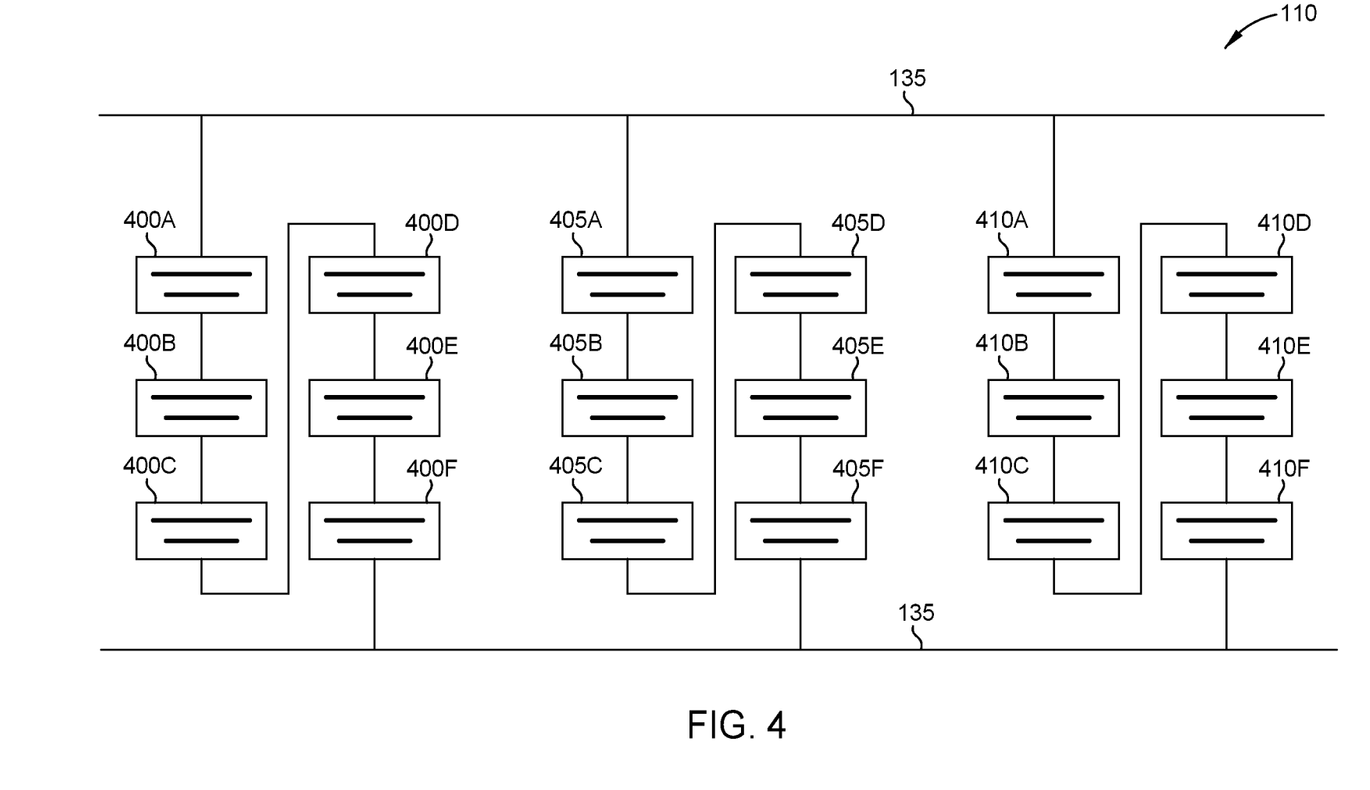
FIG. 4 is a schematic diagram of one embodiment of the onboard energy subsystem.

FIG. 4 is a schematic diagram of one embodiment of the onboard energy subsystem 110 as disclosed herein. The onboard energy subsystem 110 includes a plurality of circuit boards shown as a first set of circuit boards 400A-400F, a second set of circuit boards 405A-405F and a third set of circuit boards 410A-410F. In one embodiment, the first set of circuit boards 400A-400F, the second set of circuit boards 405A-405F, and the third set of circuit boards 410A-410F are the conductors 225 formed in or on the finned spar members 125 shown in FIGS. 2A and 2B and/or the circuit patterns shown in FIG. 3B. The bus bars 135 are also shown in FIG. 4 and may be provided in or on the finned spar members 125 as shown in FIGS. 1 and 2A.

In this embodiment, each of the first set of circuit boards 400A-400F, the second set of circuit boards 405A-405F, and the third set of circuit boards 410A-410F include metallic conductors formed in or on the finned spar members 125 as the conductors 225 shown in FIGS. 2A, 2B and 3B. The first set of circuit boards 400A-400F, the second set of circuit boards 405A-405F, and the third set of circuit boards 410A-410F may be aluminum, copper, or some other conductive material.

Each of the circuit boards 400A-400F, 405A-405F, and 410A-410F may be other standalone electronic devices, such as microcontrollers, sensors (e.g., strain, stress, temperature, environmental, and others), or any other sort of electronic device. Other electronic devices include diodes, fuses, circuit breakers, as well as other circuitry or portions thereof.

In this embodiment, each of the individual circuit boards of the first set of circuit boards 400A-400F, the second set of circuit boards 405A-405F, and the third set of circuit boards 410A-410F are connected in series and the collective sets are connected to the bus bars 135 in parallel. While only three sets of circuit boards are shown, addition sets of circuit boards may be provided along the length of the spar 105 (shown in FIG. 1).

Example Embodiments

The following are example embodiments. Notably, the reference numerals in the examples below are merely examples. Further, even if single claim dependencies are indicated in the following examples, or in the claims below, all claim dependencies, including multiple claim dependencies, are included within the scope of the present disclosure.

Embodiment 1: A structural member for a vehicle, the structural member comprising a plurality of finned spar members (125) interlocked with one another, wherein each finned spar member of the plurality of finned spar members includes a main body (200); a plurality of web members (207) extending from a flange (205) of the main body; a circuit board (400A-400F, 405A-405F and 410A-410F) provided on the main body; and a bus bar (135) comprising a tube positioned in an opening (230) formed in the main body, the bus bar being in electrical communication with the circuit board, wherein a compartment (120) is formed between adjacent web members, the compartment being sized to receive a battery (115).

Embodiment 2: The structural member of Embodiment 1, wherein the structural member is an aircraft spar (105).

Embodiment 3: The structural member of Embodiment 1, wherein each of the plurality of web members includes a flexible portion (210) that flexes and rebounds.

Embodiment 4: The structural member of Embodiment 3, wherein the flexible portion interfaces with retaining members (215) formed adjacent to the flange.

Embodiment 5: The structural member of Embodiment 1, further comprising a plurality of conductors (225) formed on each of the finned spar members that are coupled to the bus bar.

Embodiment 6: The structural member of Embodiment 1, wherein the plurality of finned spar members comprises a first finned spar member and a second finned spar member and each of the first finned spar member and the second finned spar member include a cross-sectional shape that is substantially identical.

Embodiment 7: The structural member of Embodiment 6, wherein the first finned spar member is rotated 180 degrees relative to the second finned spar member along a length direction of the first finned spar member in an interlocked position.

Embodiment 8: The structural member of Embodiment 6, wherein a plurality of first openings are (240) formed in the flange of the first finned spar member and a plurality of second openings (400) are formed in the flange of the second finned spar member, at least a portion of the second openings are adapted to receive a fastener that couples to a wing.

Embodiment 9: The structural member of Embodiment 8, wherein each of the plurality of first openings substantially align with each of the plurality of second openings in an interlocked position.

Embodiment 10: An aircraft spar (105), comprising a plurality of finned spar members 125 interlocked with one another, wherein each of the finned spar members include a main body (200); a plurality of web members (207) extending from a flange (205); a circuit board (400A-400F, 405A-405F and 410A-410F) affixed to the main body; and a bus bar (135) comprising a tube positioned in an opening (230) formed in the main body, the bus bar being in electrical communication with the circuit board, wherein a compartment (120) is formed between adjacent web members, each compartment being sized to receive a plurality of batteries (115).

Embodiment 11: The aircraft spar of Embodiment 10, wherein each of the plurality of web members includes a flexible portion (210) configured to attach to a retaining member (215) of the flange.

Embodiment 12: The aircraft spar of Embodiment 11, wherein the flexible portion comprises two flexible members and a slot (245) is provided therebetween.

Embodiment 13: The aircraft spar of Embodiment 10, further comprising a plurality of conductors (225) formed on the finned spar members that are coupled to the bus bar.

Embodiment 14: The aircraft spar of Embodiment 10, wherein the plurality of finned spar members comprises a first finned spar member and a second finned spar member each having a substantially identical cross-sectional shape.

Embodiment 15: The aircraft spar of Embodiment 14, wherein the first finned spar member is rotated 180 degrees relative to the second finned spar member along a length direction of the first finned spar member in an interlocked position.

Embodiment 16: An onboard energy subsystem (110) for a vehicle, the onboard energy subsystem comprising a structural member (105) comprising a plurality of batteries (115), wherein the structural member comprises a plurality of finned spar members (125) interlocked with one another, wherein each of the finned spar members include a main body (200); a plurality of web members (207) extending from a flange (205); a circuit board (400A-400F, 405A-405F and 410A-410F) formed on the main body; and a bus bar (135) comprising a conductive tube positioned in an opening (230) formed in the main body, the bus bar being in electrical communication with the circuit board, wherein a battery of the plurality of batteries is compressed in a compartment (120) formed between adjacent web members.

Embodiment 17: The onboard energy subsystem of Embodiment 16, wherein multiple groups of the plurality of batteries are connected in series along the structural member.

Embodiment 18: The onboard energy subsystem of Embodiment 17, wherein the multiple groups of the plurality of batteries are connected in parallel to the bus bar.

Embodiment 19: The onboard energy subsystem of Embodiment 16, further comprising a power management device (130) coupled to the structural member coupled with the plurality of batteries and the bus bar.

Embodiment 20: The onboard energy subsystem of Embodiment 16, further comprising a plurality of electrical generating devices (235) coupled to the structural member.

The preceding description is provided to enable any person skilled in the art to practice the various embodiments described herein. The embodiments and examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A structural member for a vehicle, the structural member comprising:
   a plurality of finned spar members interlocked with one another, wherein each finned spar member of the plurality of finned spar members includes:

a main body;

a plurality of web members extending from a flange of the main body, wherein each of the plurality of web members includes a flexible portion;

retaining members formed on the flange and configured to interlock each of the finned spar members of the plurality of finned spar members, wherein the flexible portion is configured to flex and rebound to compress and couple to the retaining members;

a circuit board formed on the main body; and a bus bar comprising a tube positioned in an opening formed in the flexible portion of the main body, the bus bar being in electrical communication with the circuit board, wherein a compartment is formed between adjacent web members, the compartment being sized to receive a battery.

2. The structural member of claim 1, wherein the structural member is an aircraft spar.

3. The structural member of claim 1, further comprising a plurality of conductors formed on each of the finned spar members that are coupled to the bus bar.

4. The structural member of claim 1, wherein the plurality of finned spar members comprises a first finned spar member and a second finned spar member and each of the first finned spar member and the second finned spar member include a cross-sectional shape that is identical.

5. The structural member of claim 1, wherein the plurality of finned spar members comprises a first finned spar member and a second finned spar member and the first finned spar member is rotated 180 degrees relative to the second finned spar member along a length direction of the first finned spar member in an interlocked position.

6. The structural member of claim 1, wherein:

the plurality of finned spar members comprises a first finned spar member and a second finned spar member; and a plurality of first openings are formed in the flange of the first finned spar member and a plurality of second openings are formed in the flange of the second finned spar member, at least a portion of the second openings are adapted to receive a fastener that couples to a wing.

7. The structural member of claim 6, wherein each of the plurality of first openings align with each of the plurality of second openings in an interlocked position.

8. An aircraft spar, comprising:

a plurality of finned spar members interlocked with one another, wherein each finned spar member of the plurality of finned spar members includes:

a main body;

a plurality of web members extending from a flange, wherein each of the plurality of web members includes a flexible portion configured to attach to a retaining member of the flange;

a circuit board affixed to the main body; and a bus bar comprising a tube positioned in an opening formed by a web member of the plurality of web members, the bus bar being in electrical communication with the circuit board, wherein a compartment is formed between adjacent web members, each compartment being sized to receive a plurality of batteries.

9. The aircraft spar of claim 8, wherein the flexible portion comprises two flexible members and a slot is provided therebetween.

10. The aircraft spar of claim 8, further comprising a plurality of conductors formed on the finned spar members that are coupled to the bus bar.

11. The aircraft spar of claim 8, wherein the plurality of finned spar members comprises a first finned spar member and a second finned spar member each having a identical cross-sectional shape.

12. The aircraft spar of claim 11, wherein the first finned spar member is rotated 180 degrees relative to the second finned spar member along a length direction of the first finned spar member in an interlocked position.

13. The aircraft spar of claim 11, wherein the bus bar is configured to increase the structural integrity of the aircraft spar.

14. An onboard energy subsystem for a vehicle, the onboard energy subsystem comprising:

a structural member comprising a plurality of batteries, wherein the structural member comprises:

a first finned spar member interlocked with a second finned spar member, wherein each of the first and second finned spar members include:

a main body;

a plurality of web members extending from a flange;

retaining members formed on the flange and configured to interlock the first finned spar member to the second finned spar member;

a circuit board formed on the main body; and a bus bar comprising a conductive tube positioned in an opening formed in the main body, the bus bar being in electrical communication with the circuit board, wherein the first finned spar member is rotated 180 degrees relative to the second finned spar member along a length direction of the first finned spar member in the interlocked position.

15. The onboard energy subsystem of claim 14, wherein multiple groups of the plurality of batteries are connected in series along the structural member.

16. The onboard energy subsystem of claim 15, wherein the multiple groups are connected in parallel to the bus bar.

17. The onboard energy subsystem of claim 14, further comprising a power management device coupled to the structural member coupled with the plurality of batteries and the bus bar.

18. The onboard energy subsystem of claim 14, further comprising a plurality of electrical generating devices coupled to the structural member.

19. The onboard energy subsystem of claim 18, wherein the plurality of electrical generating devices are configured to generate electricity from bending of the structural member.

* * * * *